United States Patent [19]
Stull

[11] 3,770,032
[45] Nov. 6, 1973

[54] RADIALLY EXPANSIBLE TIRE SUPPORTING APPARATUS
[75] Inventor: John A. Stull, La Mirada, Calif.
[73] Assignee: James A. Smyser, Bakersfield, Calif.
[22] Filed: May 4, 1967
[21] Appl. No.: 641,104

Related U.S. Application Data
[63] Continuation-in-part of Ser. No. 388,518, Aug. 10, 1964, abandoned.

[52] U.S. Cl. ............................................. 144/288 A
[51] Int. Cl. ..................................... B60c 25/00
[58] Field of Search ................... 144/288 A; 157/13

[56] References Cited
UNITED STATES PATENTS
3,291,171  12/1966  Lehmann ................. 144/288 A Primary Examiner—Donald R. Schran
Attorney—Huebner and Worrel

[57] ABSTRACT

A radially expansible tire supporting apparatus having a plurality of radially disposed spokes, arcuate rim segments individual to the spokes disposed in annular arrangement to define a tire receiving rim, and means for correspondingly radially extending and retracting the spokes to effect controlled expansion and contraction of the rim, the rim segments being releasably mounted on their respective spokes and being provided in sets of different diameters to accommodate corresponding tires of different sizes.

3 Claims, 15 Drawing Figures

JOHN A. STULL
INVENTOR

Huelmer & Worrel
ATTORNEYS

JOHN A. STULL
INVENTOR

Huebner & Worrel
ATTORNEYS

JOHN A. STULL
INVENTOR

Huebner + Worrel
ATTORNEYS

PATENTED NOV 6 1973 3,770,032

JOHN A. STULL
INVENTOR

Huebner & Worrel
ATTORNEYS

3,770,032

RADIALLY EXPANSIBLE TIRE SUPPORTING APPARATUS

CROSS-REFERENCE TO RELATED APPLICATION

This application is a continuation-in-part of my copending application Ser. No. 388,518, entitled "Radially Expansible Tire Supporting Apparatus," filed Aug. 10, 1964, now abandoned.

BACKGROUND OF THE INVENTION

In mounting and supporting tires for rotation in an inflated condition incident to operations preparatory to recapping or retreading, a device allowing interchanging of tires having different rim sizes is available. Such a device may advantageously be constructed so as to allow such mounting and supporting of successive vari-sized tires, whether tubed or tubeless, in airtight engagement to permit the maintenance of an inflated tire condition.

Conventional apparatus used for such operations utilize a tire rim engaging element permanently integrally mounted on a rotatable hub. Examples of such apparatus are shown in prior U.S. Pat. Nos. 2,937,676, issued May 24, 1960, and No. 2,960,130, issued Nov. 15, 1960. In order to accommodate tires of several sizes, the rim element must either be capable of expansion and retraction throughout the entire range of tire sizes or, following a different approach, be readily removable for replacement by separate alternate rim elements covering such a range of sizes, and such replacement element must be dependably maintained in a desired oriented position. The present invention relates to improvements using the latter approach as further advancements in the general structures of prior patents. More particularly, the subject invention relates to improved means for expanding, contracting, removing and replacing the rim elements.

Accordingly, it is an object of the present invention to provide a tire supporting apparatus adapted to accommodate a series of tires extending through a predetermined range of progressively larger rim sizes.

Another object is to provide such a tire supporting apparatus having radially expansible tire-supporting rim elements readily removable from the apparatus.

Another object is to provide a tire supporting apparatus having a basic supporting structure adapted to accommodate a series of tire-supporting rim elements extending through a predetermined range of progressively larger rim element sizes.

Another object is to provide such a tire supporting apparatus in which the expansible rim elements contact the tires in frictional driving engagement and hermetically sealed relation.

Another object is to provide such a tire supporting apparatus in which the expansible rim elements provide communication between the tire and a source of compressed air.

These, together with other objects, will become more fully apparent upon reference to the following description and accompanying drawings.

DESCRIPTION OF THE PREFERRED EMBODIMENTS

Referring more particularly to the drawings, a first form of tire supporting apparatus embodying the principles of the present invention is shown in FIGS. 1 through 8. The apparatus includes a support frame 10, a rotatable hub 11 and a power source 12 for rotating the hub. An expansible rim element 13, representing one of a series of vari-sized rim elements 13, 14, 15 and 16, is mounted on the hub for rotation therewith. A tire 17 is mounted on the rim element 13 in frictional driving hermetically sealed engagement. The rim elements 13, 14, 15, and 16 are of graduated diametral sizes and adapted individually to accommodate various sizes of tires extending through a predetermined range of rim diameters.

The representative rim element 13 consists of an annular arrangement 21 of arcuate or concavo-convex segments 22 formed of a lightweight rigid material, such as aluminum. Each of the segments is axially elongated and terminates at each axial end in a respective arcuate bead retainer flange 23 projecting radially outward from the annular arrangement. The arcuate flanges of all the segments in the annular arrangement coact to form an annular flange circumscribing the entire rim element 13. Thus, the rim element has two oppositely disposed flanges 24 extending around its entire circumference and serving respectively to retain the opposite beads 25 of the tire 17 mounted on the rim element. A circumferential channel 30 is disposed axially inwardly of each of the retaining flanges 24 and contiguously parallel therewith. Each channel serves to seat a tire bead on the rim element.

Each segment 22 provides a circumferentially convex outer surface 31 and a circumferentially concave inner surface 32. The degree of convexity of the outer surface is greater than the curvature of the rim element 13, as shown at 35 in FIG. 5. This contrast results in oppositely beveled portions 33 in the outer surface, sloping respectively toward the adjacent rim segments. The beveled portions terminate in each axial direction in a radially inwardly disposed shoulder 34 adapted to abut against the oppositely facing shoulder of the adjacent rim segment.

A series of axially spaced, elongated fingers 40 projects circumferentially from each beveled portion 33 and extends toward the adjacent rim segment 22. The circumferential extent of these fingers is such that they each project beyond the shoulder 34 a distance substantially equal to the circumferential extent 41 of the beveled portion of the rim segment. The fingers of a series are equispaced and arranged in axial alignment so as to interleave with the corresponding fingers of the opposite rim segment. The fingers are beveled on their radially inner surfaces 42 so as to conform to the corresponding beveled surface portion 33 of the adjacent rim segment. Their combined outer surface is arcuately formed at substantially the same radius as the annular arrangement of the segments in the rim element so that, when assembled, the outer surface afforded by the interleaved fingers and the concave outer surface 31 of the rim elements form a substantially uniform quadric surface. Due to the radially inward positioning of the tire bead channels 30 the fingers 44 disposed therein appear somewhat offset from the main body of fingers. However, the same criteria govern their disposition as that which govern the other fingers.

Figure 8:
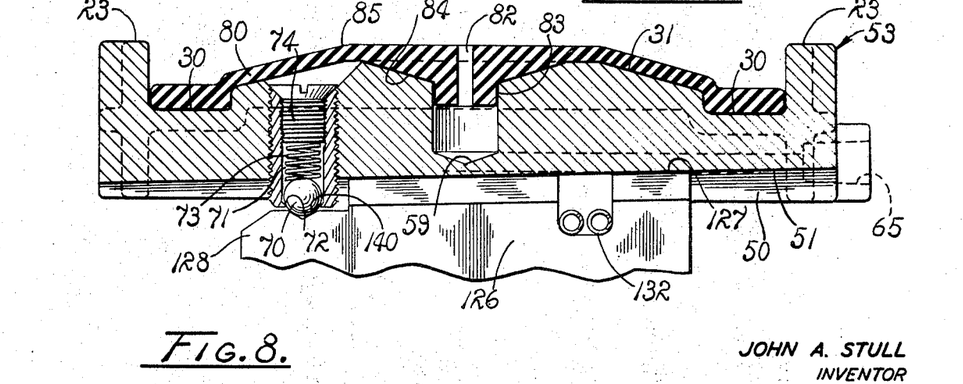
FIG. 8 is a radial section of one of the segments of a rim element, taken along line 8—8 of FIG. 7.
Figures 9, 10, 11:
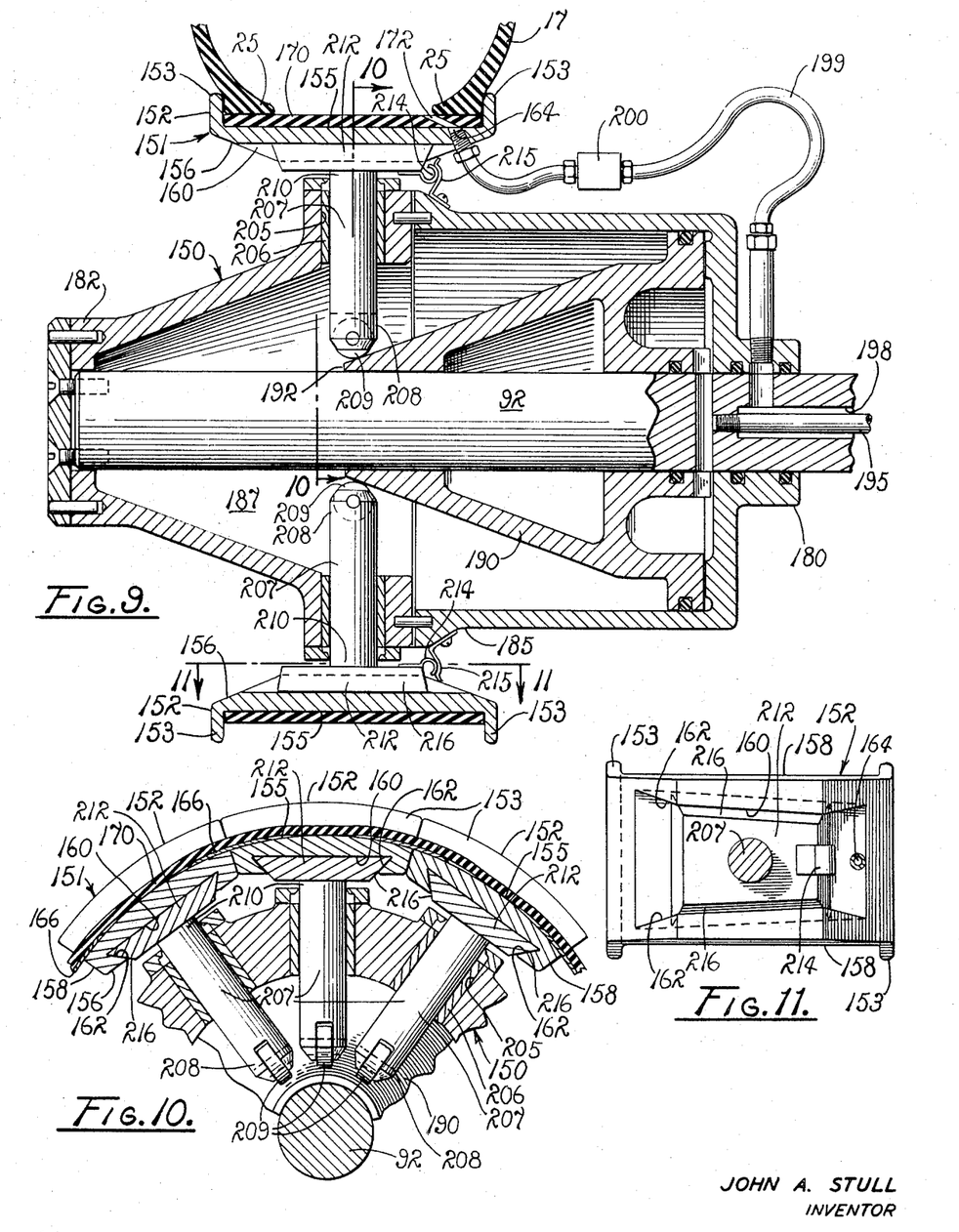
FIG. 9 is a vertical central section through a second form of tire supporting apparatus embodying the principles of the present invention showing the tire supporting rim segments in a retracted position.
FIG. 10 is a transverse vertical section, taken generally along the line 10—10 of FIG. 9.
FIG. 11 is a horizontal section through one of the rim segment mounting spokes, taken on line 11—11 of FIG. 9 showing the mounting shoe and rim segment in bottom plan.

The inner surface 32 of each segment 31 presents a substantially cylindrical surface having the same curvature as the annular rim element 13. An elongated rectilinear groove 50 extends centrally along the entire axial length of the inner surface. The bottom surface 51 of the groove is sloped at a constant graduation in relation to the inner surface of the segment thereby giving the groove a beveled depth profile as shown in FIG. 8. Through one of the segments 53 is a tunneled conduit 54 having a relief outlet 57 situated centrally of the segment and passing through the inner surface thereof. An air relief valve 58 is mounted in this outlet. A tire inflation outlet 59 passes through the outer convex surface 31 of the rim segment. This outlet is situated in a cylindrical depression 60 extended radially into the outer surface portion of the rim segment and communicating with the relief conduit outlet. An inlet 65 to the conduit is provided at one axial end of the rim segment, where it passes axially through the corresponding bead retainer flange 23. The outlet is adapted for connection to an air supply hose 66 in any suitable manner, such as by means of a threaded aperture.

A spring-mounted ball retainer latch 70 is mounted in the shallow portion of the groove 50 of at least one of the segments, preferably the valved segment 53. The ball is held in place in a well 71 extending through the segment and having a contracted opening 72 constraining the ball. A coil spring 73 holds the ball in place and is secured within the aperture by means of a screw 74. If desired, several such ball retainer latches, or detents, are mounted in respective segments of the rim element.

An annular elastomeric band 80 is fitted around the outer periphery of the rim element 13 between the tire bead retainer flanges 24 and constrains the rim segments 22 in their annular relation. In such a relation, the shoulders 34 of adjacent segments are in abutting contact. The band 80 is formed of any suitable air impervious, elastic material and provides on its interior surface a series of radially inwardly extended cylindrical nubs 81 of a size individually to fit into the depressions 60 of the respective rim segments and frictionally engage the same. When the band is positioned about the segments, the nubs serve to anchor the band and circumferentially to urge the segments together toward a retracted position. A tire inflation or air inlet aperture 82 extends concentrically through at least one of the nubs, such as the nub 83. When the band is placed about the rim element, thus nub 83 is positioned in the depression of the segment which contains the air conduit 54 and inflation outlet 59. This depression is flared radially outward to produce a reinforcing anchor effect when the band is compressed into the depression as shown at 84. The outer surface 85 of the band resiliently conforms to the outer surfaces 43 and 30 of the rim element to allow hermetically sealed engagement between the beads of a tire and the rim element.

The support frame 10 includes a standard control housing 90. A horizontally rotatable hollow axle 92 is mounted on the frame and includes an airtight hub 11 having an outer free end 94. Driving force is imparted to the axle through a pulley to which is attached an endless belt 100 extending about the drive pulley 101 of a suitable power source, such as an electric motor 12. The motor is operated through conventional controls 103 within the housing 90 accessible from the outside of the housing.

The hub includes a cylindrical airtight structure mounted concentrically rigidly upon the axle and supported at both ends thereof. A truncated hollow conical member 109 is mounted in hermetically sealed horizontally slidable relation within the hub. The truncated end 110 of the conical member is directed toward the free outer end of the hub which provides a truncated hollow conical extension 111 to accommodate the conical interior member when it is in an outwardly extended position. A source of compressed air is connected by an airtight tube 116 to the proximal end of the axle at 117. An air passage leads through the axle into the interior of the hub. The supply hose 66 extends from the hub and provides a valve 118 for connection to the tunnel conduit inlet 65 provided in a segment 53 of the rim element 13. Suitable structure to support individual rim elements, such as element 13, is also shown in the aforementioned United States patents. Also shown is inflation apparatus adaptable for use with the present invention.

A series of elongated parallel axially aligned slots 125 extend circumferentially equispaced around the outer wall of the hub 11. Extending adjustably through each of the slots is a substantially planar plate-type spoke or fin 126. The fins have respective radially outwardly extended rectilinear edges 127 oriented in a hollow frustum arrangement having its contracted end 128 disposed toward the free end of the hub. The outer rectilinear edges of the fins are restrained from radially outward movement by means of an endless garter spring 132 circumscribing the fins. The fins may be extended or retracted radially to any selected position within the total range of movement by means of the conical member 109 inside the hub. Such selective positioning permits selective mounting of the rim elements 13, 14, 15 and 16. The interior edges of the fins rest flush against the surface of the conical member, as shown at 133. Sliding the conical member inwardly and outwardly will give to the fins the various radial positions desired. They are held in the desired position by appropriately locking the conical member. This is accomplished by use of any suitable locking device such as the plunger with detent, shown at 134, which cooperates with a serrated portion 135 of the conical member.

The size of the fins 126 is sufficient to fit into the tapered grooves 50 on the interior surfaces of the rim element 13 and at the same time to give sufficient strength to impart rotational movement to the rim element and the tire supported thereon. Each of the fins has a notched portion 140 adapted to engage a ball retainer latch 70 where the corresponding rim segment is equipped with same so as to prevent axial movement of the rim element and tire assembly upon the hub.

The truncated conical member 109 within the hub 11 may be adjustably positioned by any suitable mechanism, such as by providing a separate compressed air system 143 leading through a separate conduit in the axle and issuing into the area inside the conical member for propelling it forward and backward into the position desired.

OPERATION OF THE FIRST FORM

Figures 1, 2:
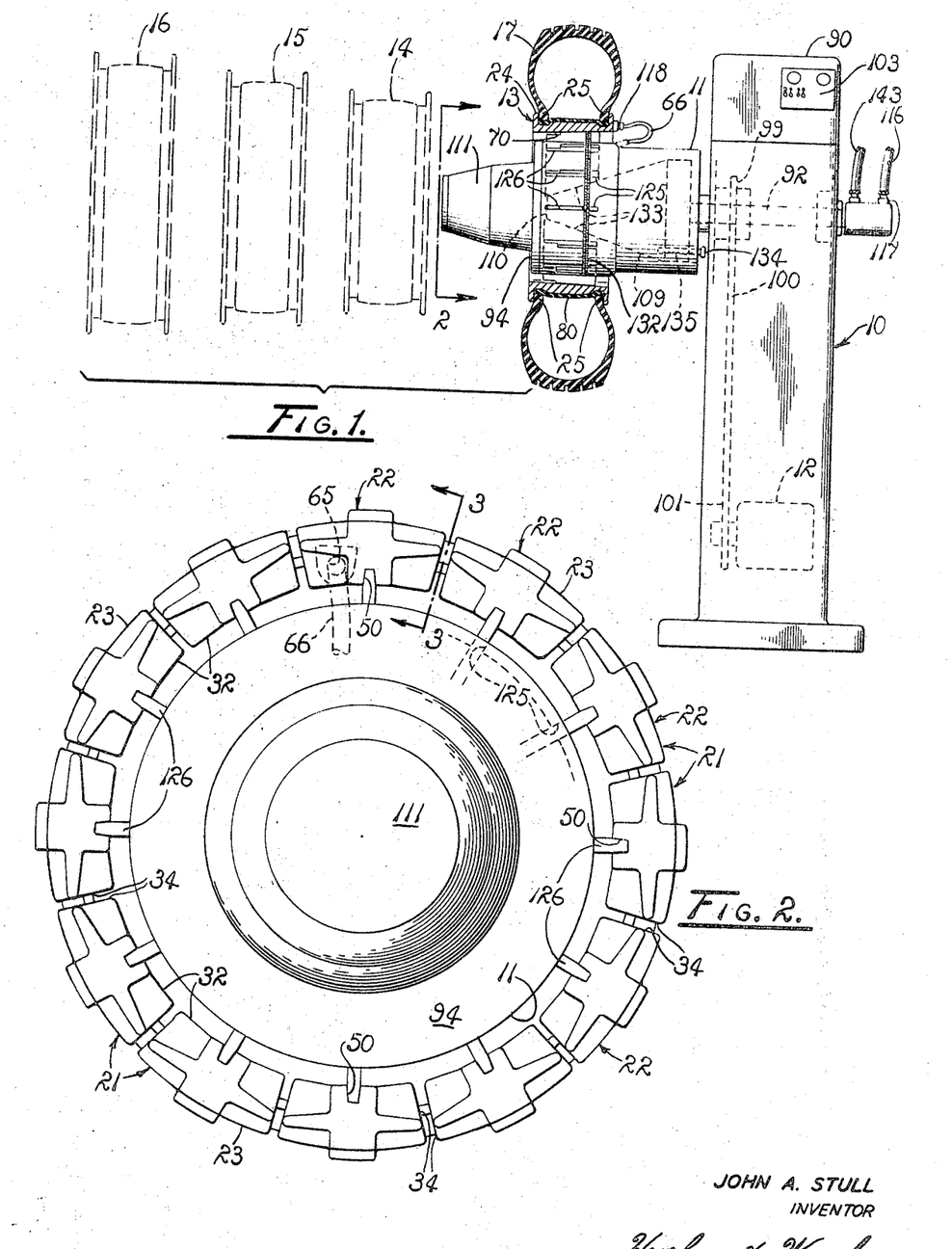
FIG. 1 is a view in side elevation and partly in vertical section of tire supporting apparatus of the present invention showing an inflated tire mounted thereon and illustrating in dashed lines a series of vari-sized tire supporting rim elements adapted to be mounted individually, successively on the tire supporting apparatus.
FIG. 2 is an enlarged end view of the hub and rim element of the tire supporting apparatus of the present invention, taken along line 2—2 of FIG. 1.
Figure 3:
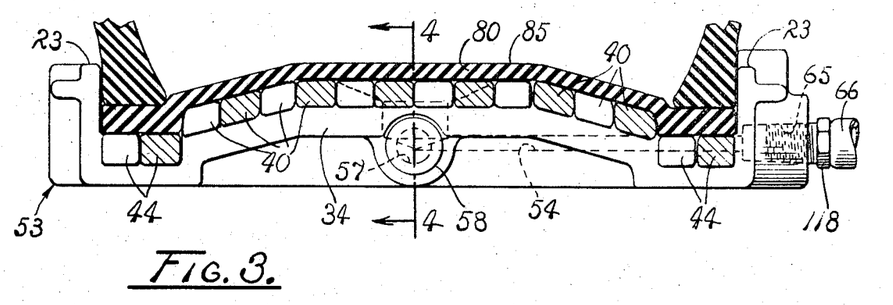
FIG. 3 is a fragmentary, enlarged radial section through the rim element of the present invention, taken along line 3—3 of FIG. 2.
Figure 4:
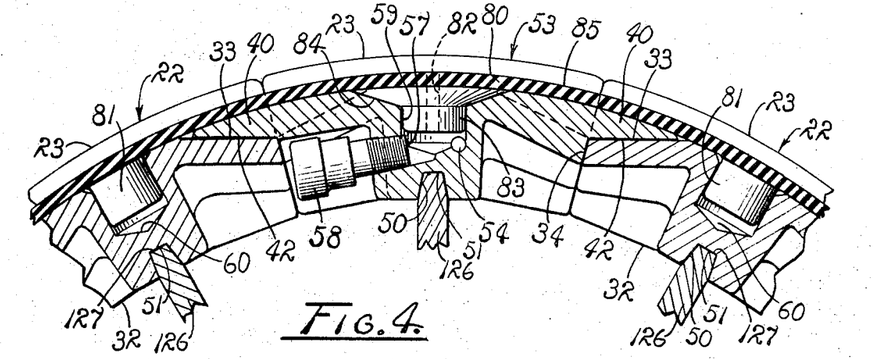
FIG. 4 is a fragmentary transverse, vertical section of a rim element of the present invention, taken along line 4—4 of FIG. 3, and showing the rim element in its interleaved interwedged retracted position.
Figure 5:
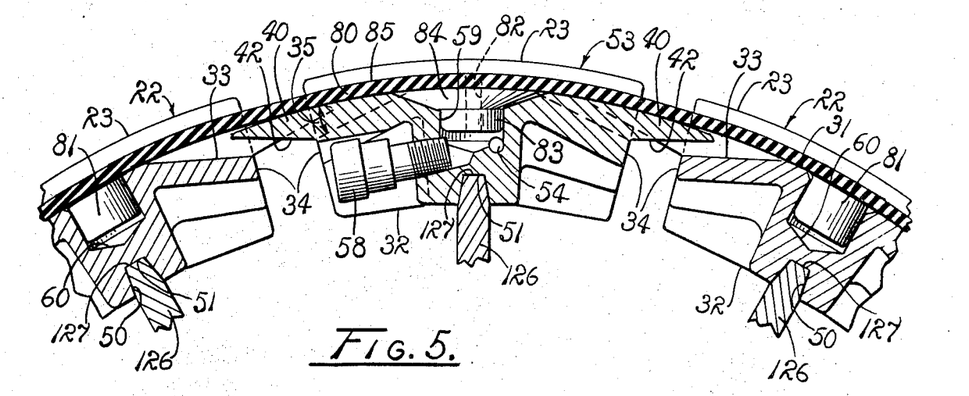
FIG. 5 is a vertical section of the rim element of FIG. 4, but shown in a radially expanded position.
Figure 6:
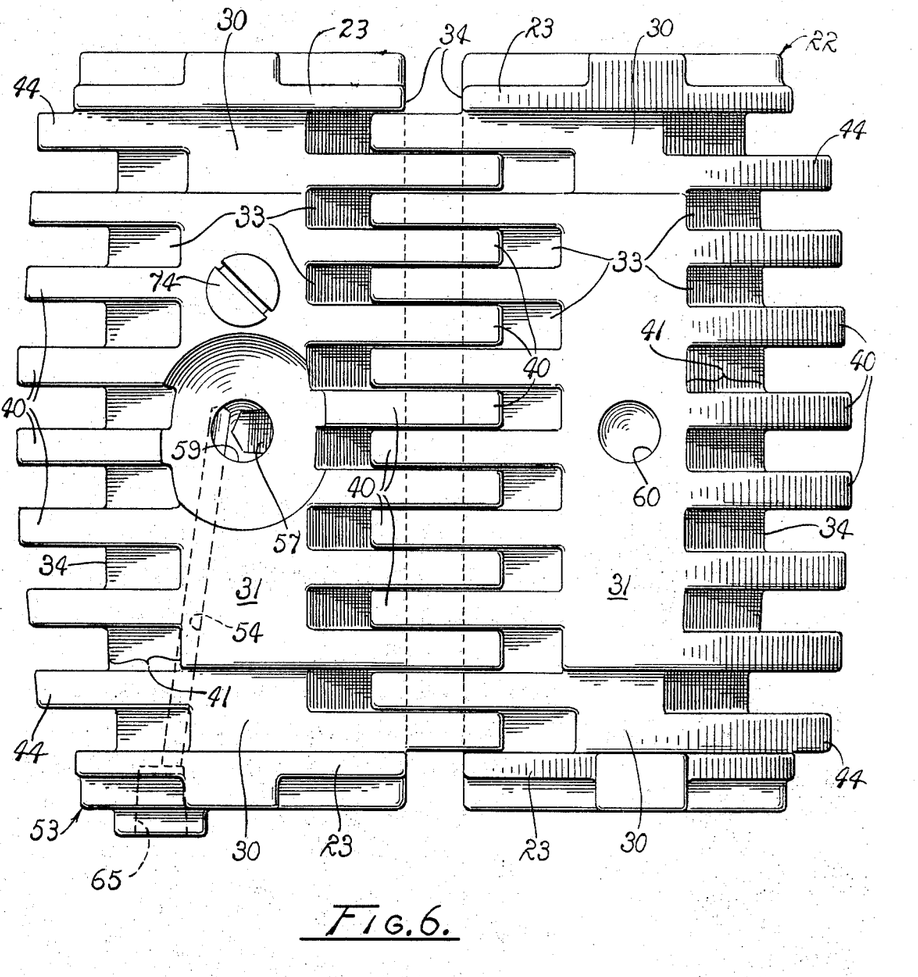
FIG. 6 is a plan view, in a radially inward direction, of two segments of a rim element in an expanded position showing the interleaved relation between the fingers.
Figure 7:
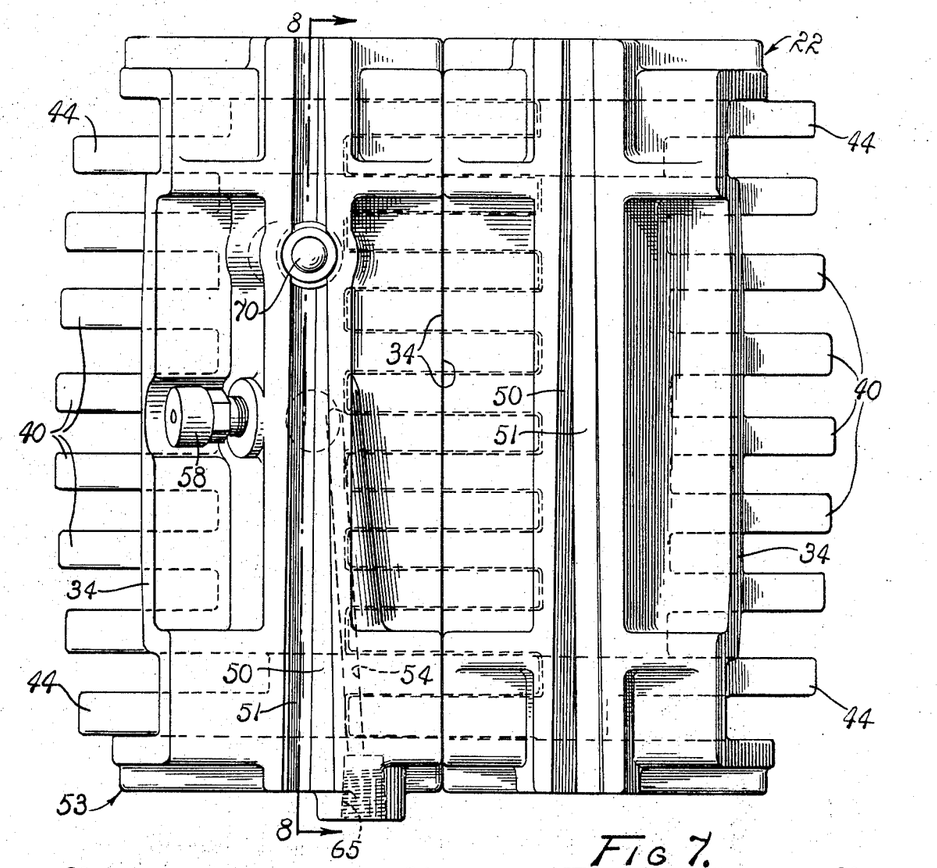
FIG. 7 is a plan view, in a radial outward direction, of the two segments of FIG. 6, showing the segments assembled in a retracted position.

The operation of the first form of the subject invention is believed to be readily apparent and is briefly summarized at this point. One of the rim elements 13, 14, 15 and 16, such as 13 as shown in FIG. 1, is selected conforming to the size of the tire which is to be processed. It is to be assumed that the rim segments 22 are disposed in their annular arrangement circumscribed by the resilient band 80 with the nubs 81 fitted into the corresponding depressions 60 on the outer surfaces of the segments. Also, the tire inflation aperture 59 of the rim element is aligned with the band apertures 82.

In supporting a tire on the apparatus for rotation during buffing or other processes, it has been found advantageous to first place the rim element 13 upon the hub 11 while the fins 126 are in a retracted position. This allow expeditious positioning of the rim element so that the grooves 50 fit over the corresponding fins and the ball latches snugly engage the respective notched portions 140. The conical member 109 inside the hub may then be adjusted so that the protruding fins expand to a position firmly engaging the tire support rim element with the rim element still in a radially retracted position as shown in FIG. 2.

Subsequently, the tire is positioned on the rim element while the rim element segments 22 are in the retracted position. The air hose 66 is then connected by means of its valve 118 to the air inlet 65 and the apparatus is ready for operation. As shown in the aforementioned United States patents, the apparatus is adaptable to pneumatic operation, and inflation of the tire in timed relation to radial expansion of the rim element. When the tire is positioned so that its beads 25 are aligned with the bead channels 30, the interior conical member is again axially adjusted so as to extend the fins further radially, thus radially expanding the interleaved rim element. Radial expansion continues until the rim element snugly fits the tire in hermetically sealed and frictional driving engagement.

Upon activation, the compressed air inflates the tire 17 to the desired degree at which time it will automatically cease. The air relief vale 58 serves as an emergency relief valve to atmosphere in case excessive inflation endangers the tire. Since the air hose 66 is mounted on the hub 11, it will rotate with the hub and the tire. Therefore, if any leakage occurs during processing of a tire, the inflation will be maintained automatically. Suitable automatic controls may be installed to help maintain the tire pressure at the desired inflation level.

With the hose 66 connected, the next step is to impart rotation to the rim and tire assembly by activating the electric motor 102 through manipulation of the controls 103 mounted on the housing. The assembly is rotated at the desired speed in either a clockwise or a counterclockwise direction. During rotation, the firm engagement of the fins 126 within the corresponding grooves 50 of the rim segments 22, as well as the locking effect of the latches 70, serve to hold the tire 17 firmly in place. Upon completion of the tire processing, the rotation of the rim and tire, as well as the assembly, is stopped. At that time, by manipulating the appropriate controls, the conical interior member 109 is axially retracted. The elastomeric band 80, in conjunction with garter spring 132, radially retracts the fins into the hub. Simultaneously, the interleaved fingers 40 of the rim segments 22 allow the tire supporting rim element to contract, thereby freeing the tire for easy removal from the rim element.

At this time and with a minimum of interruption, the next tire in line may be immediately positioned over the rim element 13 and the entire process repeated. There is no need to remove the rim element and the tire together for any belabored manipulation or dismemberment of any of the rim elements or segments 22.

When it is desired to process a larger or smaller tire than that accommodated by the particular rim element already in use, it is merelY necessary to retract the fins 126 further into the hub 11 to remove the rim element and replace it with a rim element of appropriate size, e.g. 14, 15 or 16. Then the fins are radially extended until the successor rim element is readily secured in place by means of the interfitting ball latches, or detents 70, and the notched portions of the fins. These interfitting indexing means permit a quick change of rim elements and reduce machine set-up time when processing tires of various sizes, such as those normally encountered in commercial tire recapping shops. The processing operation then proceeds as previously described.

The range of tires which can be accommodated by the apparatus is determined solely by the sizes of the rim elements. Any size tire from that of the smallest automobile to that of the largest truck may be readily accommodated.

SECOND FORM

A second form of a tire supporting apparatus embodying the principles of the present invention is shown in FIGS. 9 through 12. The second form has a rotatable hollow hub 150, somewhat similar to the hub 11 of the first form which is adapted to be mounted on the hollow axle 92 of the support frame 10 with rotation of the hub being controlled in the manner previously described for the first form of the invention. As before, an expansible rim element 151, which represents one of a series of vari-sized rim elements similar to rim elements 13, 14, 15 and 16 shown in FIG. 1, is adapted to support a tire 17 for rotation on the hub.

Further like the rim element 13 of the first form, the rim element 151 provides a plurality of annularly arranged arcuate rim segments 152 preferably formed of a lightweight rigid material, such as aluminum. Each of the segments is elongated axially of the hub and terminates at each axial side of its element in an arcuate tire bead retainer flange 153 extended radially outwardly from its segment. The arcuate flanges of the successive segments in the annular arrangement coact to form a pair of parallel annular flanges circumscribing the entire rim element 151 to retain the opposite beads 25 of the tire 17 on the rim element. Each of the rim segments 152 provides a longitudinally convex outer surface 155 and an inner surface 156. The rim segments further include circumferentially disposed opposite ends 158 which are adapted to abut against the oppositely facing ends of the adjacent rim segments when the segments are retracted to form as small a rim element as practical.

The inner surface 156 of each rim segment 152 has an elongated wedge-shaped, centrally disposed, groove 160 extended axially of the rim element and defined by opposite beveled side walls 162. The side walls are disposed in converging relation from one of the flanged ends 153 of the rim segments to the other. An air line receiving passage 164 is provided in one of the rim segments and angularly extended from the inner surface 156 adjacent to one of the flanges 153 to the outer surface 155.

An annular elastomeric gasket band 170 is tensioned around the outer periphery of the rim element 151 between the tire bead retainer flanges 153 and tends to contract the rim element. It also can be used to constrain the rim segments 152 in their annular relation as when assembled off of the hub. In such arrangement, the circumferentially adjacent ends 158 of adjacent segments 152 are disposed in abutting contact with the rim segments in a fully retracted condition. As in the first form, the band 170 is formed of any suitable air-impervious, elastic, compressible material and has an air inlet aperture 172 formed therein which is aligned with the air passage 164. The band resiliently conforms to the outer surface 155 of the rim segments to permit hermetically sealed engagement between the beads 25 and the tire 17 and the rim element. A plurality of resiliently flexible bridging plates 166 are disposed between the rim segments and the band and in overlapping spanning relation between adjacent ends 158 of the rim segments. The plates may either be connected to the inner surface of the band or may have an end secured to one of their respectively over-lapped rim segments while slidably engaging their respective opposite overlapped rim segments. Accordingly, the plates dependably support the band in all radial positions of the rim segments during separation of their adjacent ends.

Figure 12:
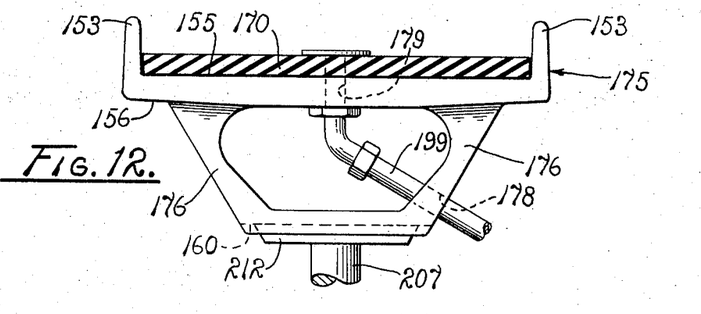
FIG. 12 is a side elevation of an alternate form of rim segment which is interchangeable with the rim segment shown in FIG. 9 of the second form of the invention.

A larger size of rim segment 175 is shown in FIG. 12 which may be considered as corresponding to the largest rim segment 16 shown in FIG. 1. Except for the increase in radial dimension and length circumferentially of its rim element, the rim segment 175 is substantially identical to the rim segment 152 with identical reference material being applied to the identical portions thereof. It will be noted that this rim segment provides opposite strut members 176 so as more widely to separate the inner and outer surfaces 156 and 155. One of the struts also includes an air line receiving apperture 178 therethrough spaced upwardly from the inner surface 156 and an air line connecting passage 179 centrally through the rim segment 175. It will be readily apparent that sets of the rim segments 152 and 175 make up rim elements of different diameters which are conveniently interchangeable depending upon the diameter of the tire to be received.

The hub 150 includes opposite inner and outer ends 180 and 182, respectively, and an intermediate portion 185 therebetween circumscribing an airtight chamber 187. A truncated conical piston 190 is mounted in circumscribing axially slidable relation upon the axle 92 within the chamber 187. The piston has a forwardly extended truncated end 192 directed toward the outer end 182 of the hub. An air supply conduit 195 in the axle 92 communicates with the chamber 187 behind the piston for controlled axial movement of the piston within the hub. The conduit 195 is connected to a source of compressed air in the manner previously described for the first form of the invention. An auxiliary air supply passage 198 is disposed in the inner end 180 of the hub and is connected to the air line receiving passage 164 or 179 in the rim segments 152 or 175 by an air hose 199. A pressure regulator 200 is provided in the hose in order automatically to protect the tire 17 against over-inflation.

A series of radially extended guide bores 205 are provided through the intermediate wall portion 185 of the hub 150 in circumferentially, equally spaced relation. A slide bearing 206 is mounted in each of the bores. An elongated rod or spoke 207 is slidably disposed in each bearing. Each of the spokes includes an inner end 208 on which is mounted a roller 209 in rolling engagement against the outer periphery of the truncated forward end 192 of the piston 190. Each of the spokes provides an opposite outer end 210 extended from the hub which mounts an elongated rim segment mounting plate or shoe 212. A spring finger 214 is preferably secured to the shoe for releasable locking engagement with a spring latch 215 on the hub 150 dependably to hold the shoe and its associated spoke in retracted position until positively extended. The shoe includes opposite beveled edges 216 which are sloped in complementary relation to the beveled side walls 162 of the grooves 160 in the rim segments 152. The beveled edges of the shoe are also tapered in oppositely converging-diverging relation to each other substantially to form a wedge receivable within the grooves 160 dependably to hold the rim segments in substantially centered relation thereon but to accommodate ready removal therefrom.

OPERATION OF THE SECOND FORM

After selection of the set of rim segments 152 or 175 providing the desired size of resulting rim element, the operation of the second form of the invention is substantially identical to that of the first form. The integral spokes 207 and the shoes 212 are extended into their respective guide bores 205 in the hub 150. The spokes are initially held in the retracted position shown in FIG. 9 by engagement of their respective fingers 214 with the latches 215 on the hub. During such positioning, the piston 190 is disposed in its retracted position with the rollers 209 of the spokes engaging the outer periphery of the piston at its truncated forward end 192. The rim segments 152 are slid axially of the hub onto their respective shoes 212 and disposed in their annular arrangement and are then circumscribed by the resilient band 270 with the air aperture 172 therein aligned with the air line receiving passage 164.

Alternatively, the annular arrangement of the rim segments 152 or 175 can be assembled, circumscribed by the band 270 and unitarily axially slidably mounted on the hub by receipt of the shoes 212 axially within the grooves 160 in their respective rim segments. Such axial positioning of the rim segments is terminated upon wedging engagement between the shoes 212 within their respective grooves 160 to the position shown in FIG. 9 with the rim segments substantially centrally disposed on the shoes. Subsequently, the tire 17 is positioned on the rim element 151 thus formed with the rim segments 152 and associated spokes 207 disposed in their retracted position of FIG. 9. The air hose 199 is connected to the air line connecting passage 164 for inflation of the tire in timed relation to radial expansion of the rim segments as previously described in the first form. As before, such radial expansion is accomplished by the controlled introduction of air under pressure through the conduit 195 and into the chamber 187 behind the piston 190. Such pressurization moves the piston 190 to the left, as viewed in FIG. 9, with the truncated forward end 192 thereof forcing the spokes radially outwardly to provide a dependable seal between the band 170 and the beads 25 of the tire 17 and the tire is inflated. The tire may then be rotated in the same manner as that described in the first form for completing the desired tire processing operation.

Upon completion of such operation, the tire may be removed by relieving the pressurized air in the chamber 187 behind the piston 190. At such time, the piston is retracted to the right under the urging of the air compressed in the forward portion of the chamber 187 trapped during initial movement of the piston to the left to expand the rim segments 152. Such force is augmented by the contraction of the band 170 which is transmitted through the spokes 207 to the piston. Other means for retracting the piston will readily occur to those skilled in the art. Upon return of the rim segments and spokes to their fully retracted position of FIG. 9, the tire is freely removable from the rim element 13. A succeeding tire may then be immediately mounted on the rim element 151 or if it is desired to process a larger or smaller tire, the rim element can be axially removed by withdrawal of the shoes 212 from their respective grooves 160 in the rim segments 152. The rim element may then be replaced by a rim element of any other desired size.

THIRD FORM

Figure 13:
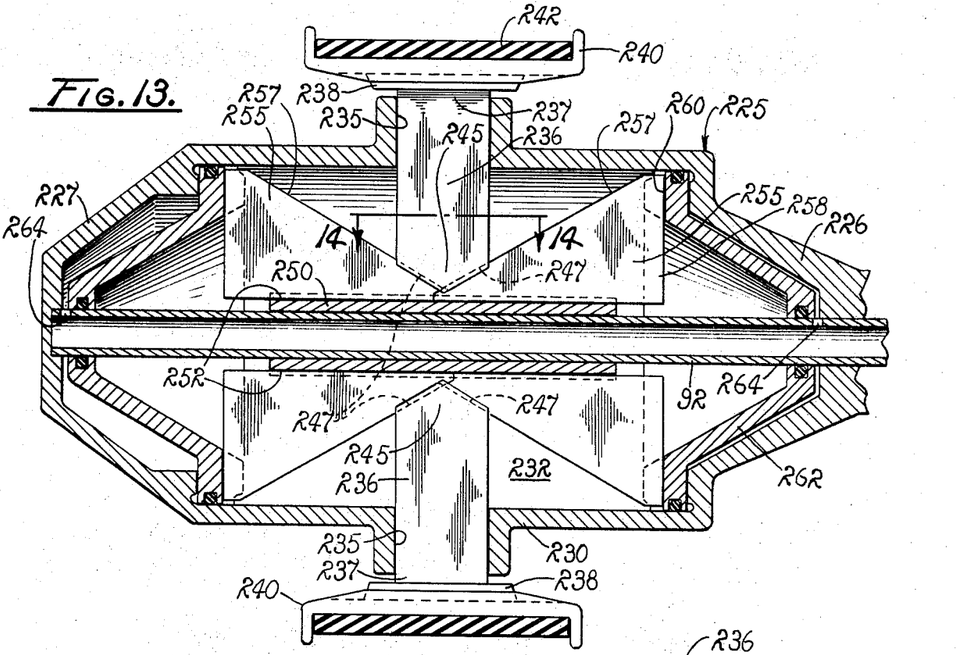
FIG. 13 is a central section through a third form of tire supporting apparatus of the present invention showing double tapered spokes and a pair of spoke actuating pistons.
Figures 14, 15:
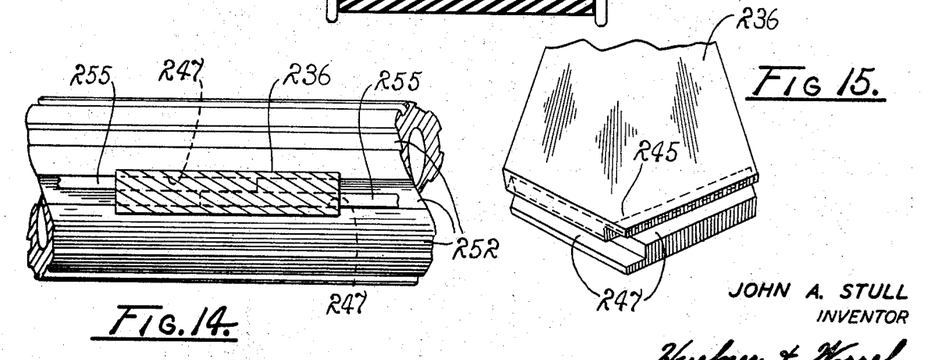
FIG. 14 is a transverse horizontal section, taken on line 14—14 of FIG. 13 through one of the spokes.
FIG. 15 is a somewhat enlarged fragmentary perspective of the lower slotted end of one of the spokes of FIG. 13.

A third form of tire supporting apparatus embodying the principles of the present invention is shown in FIGS. 13 through 15. This form provides an elongated hollow hub 225 having opposite inner and outer ends 226 and 227, respectively, mounted on the hollow axle 92 and an intermediate portion 230 circumscribing a hermetically sealed chamber 232.

A plurality of slots 235 disposed longitudinally of the hub 235 are radially extended in circumferentially equally spaced relation around the intermediate portion of the hub. Extending slidably through each of the slots is a substantially planar plate or spoke 236 having an outer end 237 mounting a shoe 238 substantially identical to the shoe 212 of the second form of the invention on which is adapted to be supported a plurality of cooperative rim segments 240 and a resiliently flexible band 242 identical to the rim segments 152 or 175 and the band 170 of the second form. The spokes include inner double tapered ends 245 which provide a pair of off-set angularly related slots 247, as best shown in FIG. 15.

An elongated tubular guide sleeve 250 is mounted in circumscribing relation about the axle 92 within the chamber 232 of the hub. The guide sleeve has a splined outer periphery providing a plurality of circumferentially equally spaced axially extended grooves 252. A pair of interlaced sets of axially opposed, radially extended spoke actuating plates 255 are slidably mounted within the grooves 252 of the guide sleeve. The adjacent plates of each set are disposed in side-by-side circumferentially overlapping relation in a common groove 252 of the sleeve. The plates include radially disposed inclined surfaces 207 inwardly over which the grooves 247 of respectively adjacent spokes 236 are fitted in slidable engagement. The plates have outer ends 258 which are individually captured within respective radial slots 260 formed in a pair of pistons 262 individually mounted within the chamber 232 at the opposite ends of the hub. In this form of the invention, the air supply passage 198 is extended through the entire length of the axle 92 and is connected with the chamber 232 behind both of the pistons 262 through a pair of spaced passages 264.

OPERATION OF THE THIRD FORM

As described, the third form of the invention distinguishes over the previously described forms in the manner in which the rim segments 240 are expanded from the hub 225. After mounting the tire 17 on the rim segments 240 in the previously described manner, air is introduced through the passage 198 in the axle 92 in order to pressurize the chamber 232 within the hub behind the pistons 262. During such pressurization, the pistons are axially traveled inwardly toward each other to move the actuating plates 255 into increased overlapping relation. During such movement, the spokes 236 are correspondingly slid outwardly through the slots 235 radially to expand the rim segments 240 in sealing relation against the tire. The tire is inflated in the usual manner and the tire processed as desired. After completion of the tire processing operation, it is easily removed by relieving the air pressure from behind the pistons and permitting the air compressed between the pistons during their above described inward movement to force the pistons axially apart toward their respectively adjacent ends of the hub. Again, such force is augmented by the force produced by contraction of the resilient band 242 about the rim segments.

From the foregoing, it will be evident that the above described three embodiments of the present invention provide effective tire supporting and inflating apparatus having radially expansible tire supporting rim elements readily removable from the apparatus and accommodating a series of tires extending through a predetermined range. The present invention is especially significant in that it allows expeditious interchanging of tires of different sizes upon a single rotatable axis while also allowing inflation of the tires during or preparatory to rotation.

Although in the foregoing description of the three forms of the present invention the hubs 11, 150 and 225 are described as having inner and outer ends and an intermediate portion, it is apparent that such portions of the hubs could be respectively designated as rear, front and middle or central portions.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices an apparatus.

Having described my invention, what I claim as new and desire to secure by Letters Patent is:

1. In a tire supporting and inflating apparatus, a support frame; a cylindrical airtight hub having a free axial end and providing communication with a source of compressed air, means rotatably mounting the hub in the frame; a plurality of elongated fins mounted on the hub in axially aligned circumferentially spaced relation, projecting adjustably radially from the hub a predetermined distance and affording respective distal ends; means carried by the frame to effect controlled radial extension and retraction of said fins; an annular radially expansible rim element comprising a plurality of separate arcuate axially elongated rim segments disposed abuttingly in an annular arrangement having a predetermined curvature and an outer annular circumference, each of said rim segments having circumferentially opposite axially extended abutting shoulders, a convex outer surface of a degree of circumferential convexity greater than the circumferential curvature of said annular arrangement to provide respective circumferentially opposite, radially inwardly beveled portions terminating at the opposite shoulders, each segment having a substantially cylindrical depression having a radially oriented central axis and disposed substantially centrally in said outer surface each of said segments having a plurality of elongated beveled fingers circumferentially projecting respectively from each of the beveled portions and extending a predetermined distance beyond said shoulder to provide on each circumferentially opposite beveled portion a series of axially equispaced fingers and adapted slidably to interleave with the corresponding oppositely disposed fingers and to engage the beveled portion of the abutting rim segment in radially expansible axially constrained wedged relation, said outer convex surface of each segment providing at each axial end an arcuate tire bead channel disposed circumferentially of the annular arrangement and bounded axially outwardly by an arcuate parallel bead retainer flange, each of said rim segments also having an inner surface providing an elongated rectilinear groove disposed centrally along the concave inner surface in axial relation with the annular rim segment arrangement and having an axially tapered depth, said groove slidably accommodating the distal end of a respective one of said hub fins, said rim segment being disposed on the hub with the greatest depth of its tapered groove positioned inwardly from the free axial end and tapering toward said free end; interfitting latching means disposed in the groove of at least one segment and adapted to engage the edge of the corresponding fin to maintain said rim element on the hub; and a resilient elastomeric air impervious annular band circumscribing the rim segments and having a plurality of equispaced internally extended cylindrical nubs of a size and spacing to fit into the respective depressions and said outer engagement surfaces securing said segments in resiliently interleaved annular arrangement, said band and the tire bead retainer flanges and channels of said rim segments cooperating to provide a peripheral surface adapted to engage a tire in frictional driving and hermetically sealed engagement, one of said band nubs providing an air inlet aperture, and one of said rim segments providing pneumatic conduit means communicating between said hub and the air inlet aperture of the band nub.

2. In a tire supporting and inflating apparatus, a support frame; a rotatable airtight hub mounted on the frame for rotation thereon and having a cylindrical outer surface and a free axial end; a plurality of elongated axially aligned planar fins mounted on the hub in equally spaced circumferential relation and projecting radially adjustably outwardly therefrom a predetermined distance, said retainer members having substantially rectilinear outer elongated edges disposed in a hollow frustum arrangement in spaced concentric relation to the cylindrical surface of said hub, said frustum arrangement providing a contracted end disposed at the free axial end of said hub; a radially expansible rim element comprising a plurality of separate arcuate axially elongated rim segments disposed abuttingly in an annular arrangement having a predetermined curvature and an outer annular surface of said hub, said frustum arrangement providing a contracted end disposed at the free axial end of said hub; a radially expansible rim element comprising a plurality of separate arcuate axially elongated rim segments disposed abuttingly in an annular arrangement having a predetermined curvature and an outer annular circumference, said segments being adapted for removable mounting on the hub, each of said rim segments having circumferentially opposite axially extended abutting shoulders, a convex outer surface of a degree of convexity in the direction of annular circumference greater than the curvature of said annular arrangement to provide respective circumferentially opposite, radially inwardly beveled portions terminating at the opposite shoulders, and a substantially cylindrical depression disposed centrally in said outer surface and having a radially oriented central axis relative to said annular arrangement, each of said segments having a plurality of elongated beveled fingers projecting respectively from each of the beveled portions and extending a predetermined distance beyond said shoulder in the direction of annular circumference to provide on each circumferentially opposite beveled portion a series of axially equispaced fingers having radially inner beveled surfaces and adapted slidably to interleave with the corresponding oppositely disposed fingers and engage the beveled portion of the abutting rim segment in radially expansible axially constrained wedged relation, said outer convex surface of each segment terminating at each axial end in an arcuate tire bead channel disposed circumferentially of the annular arrangement and bounded axially outwardly by an arcuate parallel bead retainer flange, each of said rim segments also having an inner surface providing an elongated rectilinear groove disposed centrally along the concave inner surface in axial relation with the annular rim segment arrangement and having an axially tapered depth, said groove slidably accommodating one of said fins, said rim segment being disposed on the hub with the greatest depth of the groove positioned inwardly from the free axial end when mounted on the hub; interfitting latching means disposed in the groove of a segment and adapted to engage the edge of the corresponding retainer member to maintain the rim element on the hub; and a resilient elastomeric air impervious annular band circumscribing the rim segments and having a plurality of equispaced radially inwardly extended cylindrical nubs of a size and spacing to fit into the respective depressions of said outer segment surfaces securing said segments in resiliently interlocked annular arrangement, said band and the tire bead retainer flanges and channels of said rim segments cooperating to provide a peripheral surface adapted to engage a tire in hermetically sealed driving engagement.

3. In a tire supporting and inflating apparatus, a support frame providing pneumatic communication with a source of compressed air; a rotatable hub mounted on the frame for rotation thereon and having a cylindrical outer surface and a free axial end; said hub communicating through the support frame with the source of compressed air and providing an outlet for the air through the outer surface of said hub; a plurality of elongated axially aligned planar fins mounted on the hub in equally spaced circumferential relation and projecting radially adjustably outwardly therefrom a predetermined distance, said fins having substantially rectilinear outer elongated edges disposed in a hollow frustum arrangement in spaced concentric relation to the cylindrical surface of said hub, said frustum arrangement providing a contracted end disposed at the free axial end of said hub; a radially expansible rim element comprising a plurality of separate arcuate axially elongated rim segments disposed abuttingly in an annular arrangement having a predetermined curvature and an outer annular circumference, each of said rim segments having circumferentially opposite axially extended abutting shoulders, a convex outer surface of a degree of convexity in the direction of annular circumference greater than the curvature of said annular arrangement to provide respective circumferentially opposite, radially inwardly beveled portions terminating at the opposite shoulders, and a substantially round cylindrical depression disposed centrally in said outer surface having a radially oriented central axis, each of said segments having a plurality of elongated beveled fingers projecting respectively from each of the beveled portions and extending a predetermined distance beyond said shoulder in the direction of annular circumference to provide on each circumferentially opposite beveled portions a series of equispaced fingers having radially inner beveled surfaces and adapted slidably to interleave with the corresponding oppositely disposed fingers and to engage the beveled portion of the abutting rim segment in radially expansible axially constrained interleaved relation, said outer convex surface of each segment terminating at each axial end in an arcuate tire-bead channel disposed circumferentially of the annular arrangement and bounded axially outwardly by an arcuate parallel bead retainer flange, each of said rim segments also having an innner surface providing an elongated rectilinear groove disposed centrally along the concave inner surface in axial relation with the annular rim segment arrangement and having an axially tapered depth, said groove slidably accommodating one of said fins, said rim segment being disposed on the hub with the greatest depth of its tapered groove positioned inwardly from the free axial end of the hub when mounted thereon; interfitting latching means disposed in the groove of a segment and adapted to engage the edge of the corresponding fin to hold said rim element on the hub; and a resilient elastomeric air impervious annular band circumscribing the rim segments and having a plurality of equispaced radially inwardly extended cylindrical nubs of a size and spacing to fit into the respective depressions of said outer segment surfaces securing said segments in resiliently interlocked annular arrangement, said band and the tire bead retainer flanges and channels of said rim segments cooperating to provide a peripheral surface adapted to engage a tire in frictional driving engagement upon radial extension of the fins and expansion of the rim element, one of said band nubs providing an air inlet aperture and one of said rim segments providing pneumatic conduit means communicating between the air outlet of the hub and the air inlet aperture of the band nub.

* * * * *

UNITED STATES PATENT OFFICE
CERTIFICATE OF CORRECTION

Patent No. 3,770,032            Dated November 6, 1973

Inventor(s) John A. Stull

It is certified that error appears in the above-identified patent and that said Letters Patent are hereby corrected as shown below:

Column 1, line 14, delete "available" and substitute ---desirable---.

Column 1, line 26, delete "eilher" and insert ---either---.

Column 3, line 40, delete "concave" and insert ---convex---.

Column 5, line 58, delete "allow" and insert ---allows---.

Column 6, line 16, delete "vale" and insert ---valve---.

Column 6, line 53, delete "merelY" and insert ---merely---.

Column 7, line 54, delete "fullY" and insert ---fully---.

Column 8, line 11, delete "material" and insert ---numerals---

Column 9, line 6, delete "idential" and insert ---identical---

In the Claims:

Column 11, line 54, after "surface" insert a comma ---,---.

Column 12, line 18, delete "engagement" and insert ---segment---.

Column 14, line 38, delete "equipspaced" and insert ---equispaced---.

Signed and sealed this 9th day of April 1974.

(SEAL)
Attest:

EDWARD M. FLETCHER, JR.
Attesting Officer

C. MARSHALL DANN
Commissioner of Patents

UNITED STATES PATENT OFFICE
CERTIFICATE OF CORRECTION

Patent No. 3,770,032      Dated Nov. 6, 1973

Inventor(s) John A. Stull

It is certified that error appears in the above-identified patent and that said Letters Patent are hereby corrected as shown below:

In the heading, cancel "James A. Smyser, Bakersfield, Calif." immediately following "Assignee" and substitute ---National-Standard Company, a corporation of Delaware---.

Signed and sealed this 15th day of October 1974.

(SEAL)
Attest:

McCOY M. GIBSON JR.
Attesting Officer

C. MARSHALL DANN
Commissioner of Patents